Figure 1:
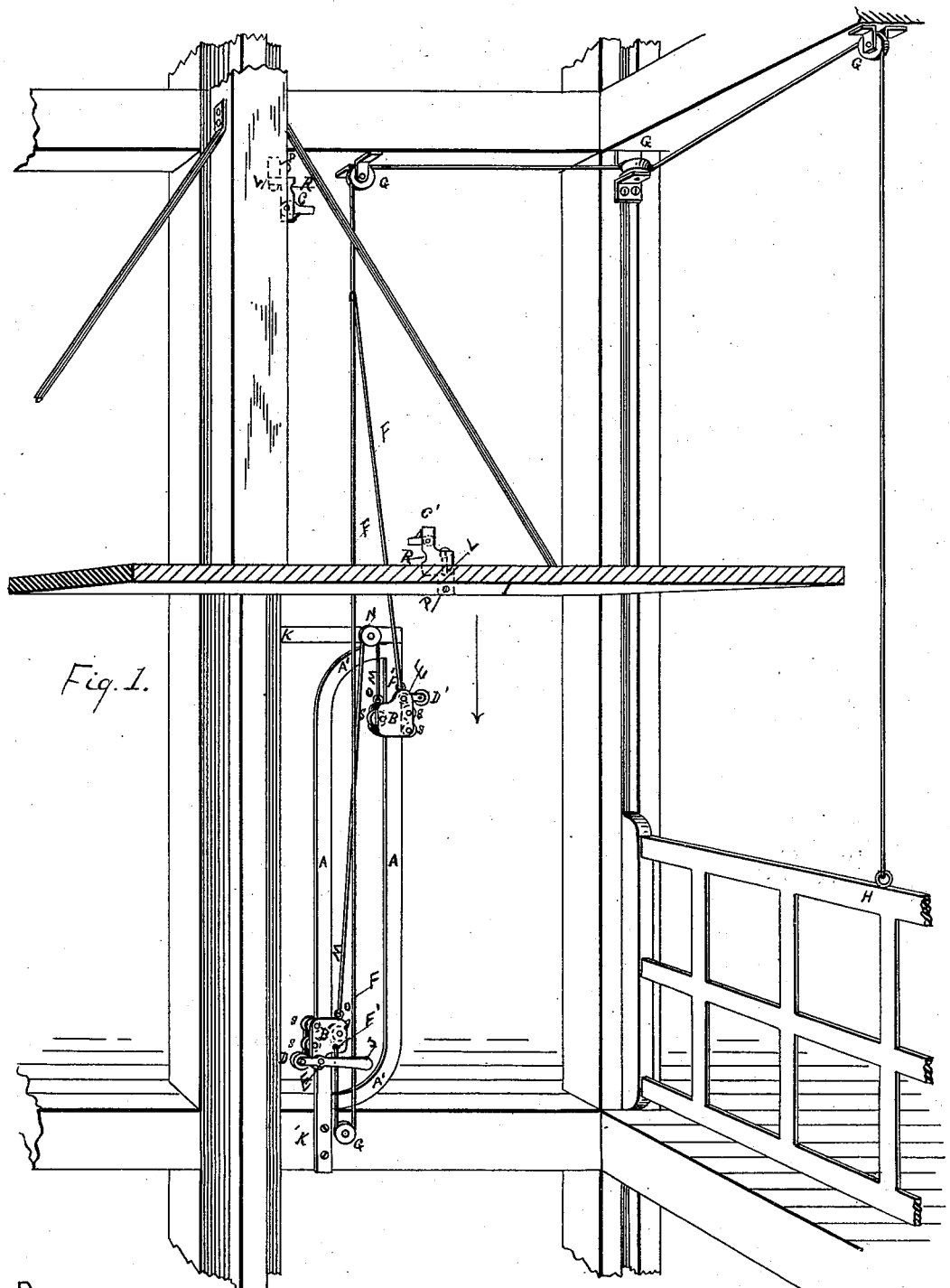

(No Model.)
2 Sheets—Sheet 1.

J. T. HOBBS.
AUTOMATIC SAFETY GATE FOR ELEVATORS.

No. 534,393.

Patented Feb. 19, 1895.

ATTEST.
R. B. Moser.
G. S. Schaeffer

INVENTOR
J. T. Hobbs

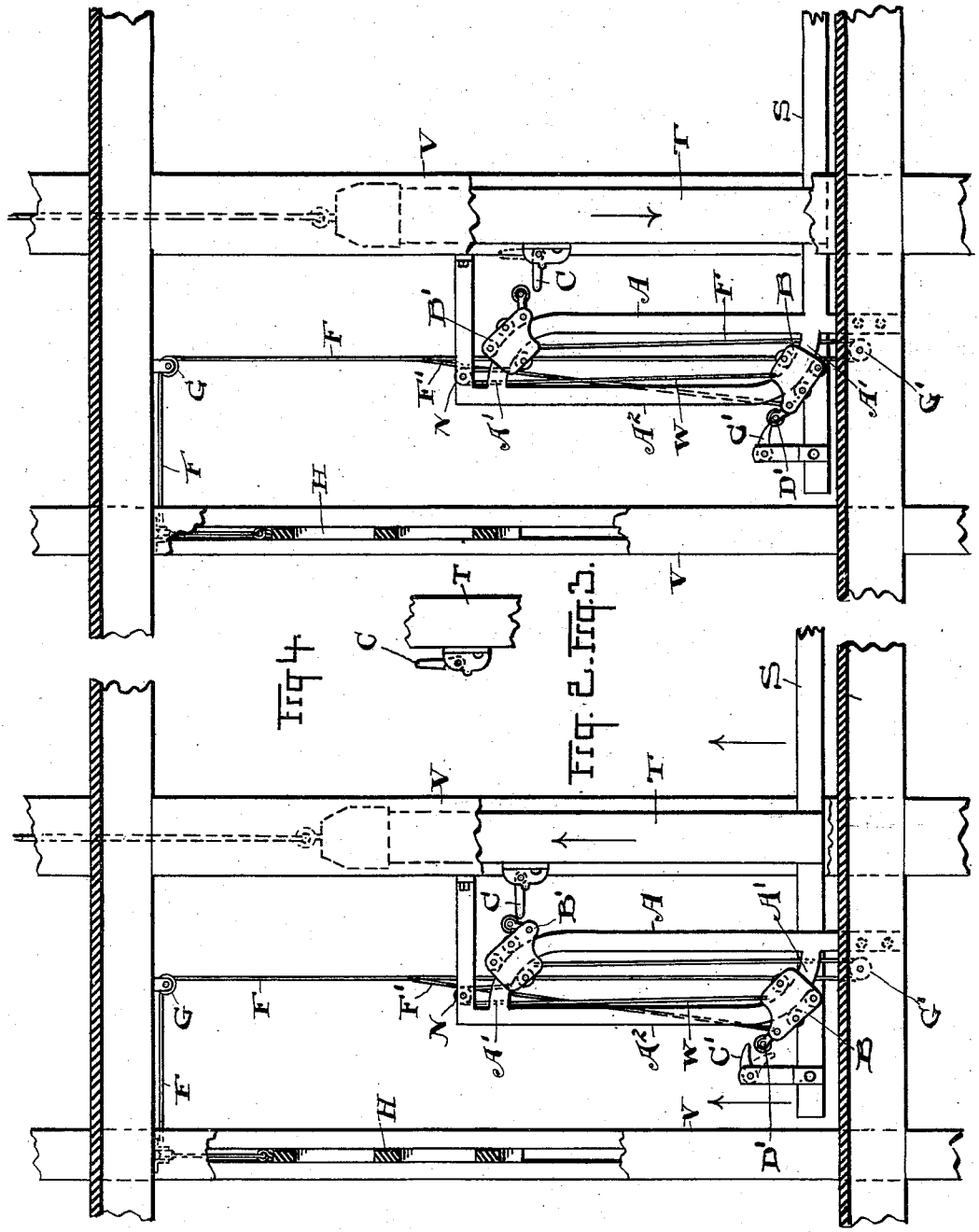

UNITED STATES PATENT OFFICE.

JOHN THOMAS HOBBS, OF CLEVELAND, OHIO.

AUTOMATIC SAFETY-GATE FOR ELEVATORS.

SPECIFICATION forming part of Letters Patent No. 534,393, dated February 19, 1895.

Application filed April 3, 1894. Serial No. 506,145. (No model.)

*To all whom it may concern:*

Be it known that I, JOHN THOMAS HOBBS, of Cleveland, county of Cuyahoga, State of Ohio, have invented an Adjustable Direct-Lift Automatic Safety-Gate for Elevators, of which the following is a specification.

My invention relates to mechanism for operating elevator gates, and the object of the invention is to provide mechanism for automatically opening and closing the gates of elevators through the movements of the platform or carriage, all substantially as shown and described and particularly pointed out in the claims.

In the accompanying drawings, Figure 1 is a perspective view, partly in section, of an elevator crib, platform and gate, and my improved attachments and connections, all as hereinafter more fully described, the gate in this instance being down and the mechanism in a corresponding position, which position is always the same when the gate is closed. Fig. 2 shows the gate raised and the mechanism in the position it assumes at the extreme limit of its movements, the lower dog on the platform having already tripped from the dotted position to the full line position and the upper dog on the platform frame being in position to pass its carriage if the platform goes up, but intended to remain beneath said carriage if the platform returns from that landing downward. Fig. 3 shows the gate up and the operating mechanism in the position it assumes when it is carried to the corresponding position with the gate as when the platform descends from a higher floor. In this case the dog on the platform is about to disengage from its carriage and the dog on the platform frame has already dropped beneath its carriage. Fig. 4 is a view of a detail as hereinafter described.

V represents the frame or crib of the elevator, S the platform and H the elevator gate. The platform is supported in a frame T of its own which slides upon the frame V in suitable guide-ways thereon, and the usual cables or ropes (not shown) are designed to be connected with said platform or carriage, as the case may be, to sustain the load and raise and lower the same. Now, having these parts, and assuming that in themselves they are of any well-known or desired construction, I introduce the mechanism shown for the purpose of automatically raising and lowering the gate as the platform reaches a landing whether going up or coming down; that is if I desire to so operate the gate, but I can traverse the entire distance of the elevator without disturbing the gates, and I can operate one or more and leave the others undisturbed, according as I may elect, and as hereinafter fully described. Usually, however, the elevator is run so as to make engagement of the gates successively as they are reached, either in ascending or descending, whereby the gates are raised when the platform approaches to and reaches a landing, and are lowered when the platform passes in either direction from a landing, and the action is the same so far as the gate is concerned and the gate closes whether the platform goes up or down. Of course it would follow that the gates would rise in succession as the platform reached them and drop as the platform left them in case the platform were going from the bottom to the top floor without stopping to discharge any part of its load, but this is not objectionable and may occur without in anywise disturbing any one upon the platform or incurring any danger. However, as already said, all the gates may be left closed as they are passed and the dogs dropped into a position to engage only the one which is to be used, if that be preferred.

Now, having thus set forth the general purpose and operation of the invention, I provide what may be termed a carriage frame for each landing or floor, and this frame is made rigid with the crib frame V. Said frame comprises two rails, bars or tracks, A and $A^2$, each curving at one extremity toward the parallel part and end of the other part. Thus, the bar A is curved outward at its top toward the bar $A^2$, and the bar $A^2$ is curved inward at its bottom toward the bar A. The reason for this curvature of said bars is obvious in Figs. 2 and 3, where the carriages B and B' are shown as occupying said curved portions, and they do occupy said portions always when the gate is in raised position as seen in said figures, whether the platform is coming from above or below, or whether it goes in one direction or the other from that point. The said carriages may be provided with suitable rollers or wheels on which they travel upon the bars or tracks A and A² to avoid friction and to render their operation easy and noiseless. All these bars correspond to the elevation the gate is to receive when open, and the maximum movement of the gate is determined by the length of said bars, because in any case the said carriages B and B' must take the end turns on said bars when the gate is open and can go no farther. Each of said carriages is connected to a common cord or cable which is connected with the gate H over sheaves G on the crib frame, the said connections being indicated by F and F' respectively. Hence, as the elevator platform and the connections engage either one of said carriages B and B' the gate will be raised through said engagement and the connections therewith described. Now, in order that the said connections F and F' should be kept taut and always ready for action, and to avoid entanglement of the ropes or cords at any point, and to get the desired action of the carriages as well, I find it necessary to connect said carriages with one another, which is done through a cord or rope W passing over a sheave N upon the top of the frame. It will also be noticed that there is a sheave G' at the bottom of frame V over which the rope F that goes from the carriage B' to the main lifting rope connected with the gate passes. Both of said carriages B and B' therefore always travel when one of them is engaged by the corresponding dog C or C', but they travel in opposite directions. Thus referring to Fig. 1, in case the platform should descend from the position there shown the dog C' would engage the sheave D' on the carriage B and this would carry said carriage down onto the bend A' of the bar A², assuming that the platform goes down to the landing. Now, the two carriages being connected by the rope W over sheave N, it would follow that the carriage B' would at the same time be drawn up and take its position on the bend A' upon the bar A. Both of said carriages would then be in position for engagement by the corresponding dog according as the platform should go up or down. If the platform should continue to go down the dog C would drop into the position shown in Fig. 3 the instant before the dog C' releases the said carriage B. Then as the dog C' descends and passes the carriage B the gravity of the gate H pulling upon the cord F would throw the carriage B instantly into engagement with the dog C, which is pivoted upon the upright or side of the platform frame or frame which supports the platform and travels therewith. Now, as the platform and the dog C descend, the dog C, holding the carriage B back, the gravity of the gate will close the gate as rapidly as the platform drops, and carry the carriages B and B' to the position shown in Fig. 1. It will be understood that the position in Fig. 1 is the normal position of the said carriage when the gate is closed, whether the platform goes up or down from a landing, so that it would be the same if it were going down instead of up as in Fig. 1; but let us assume that the platform is continuing on its course upward, as in Fig. 2. In doing this both the carriages are carried onto the bends A' of the tracks A and A² and the dog C' trips so as to go above the carriage B slightly while the dog C is just about to disengage the carriage B' and will do so as the platform and its frame carrying said dog C' rise a little farther. The instant this disengaging of dog C with carriage B' occurs the dog C' is in position to catch over the upper edge or roller of the carriage B, and then as the platform continues to rise the gravity of the gate will pull against dog C' through the cords connecting carriage and gate. Now, as the platform ascends and goes to the next landing the same operation exactly is repeated at said landing because like mechanism for automatically opening and closing the gate is furnished for each landing, and each set of mechanism is independent of the other set. The dogs C and C' are pivoted in suitable brackets and affixed to the moving car frame and the platform respectively, as shown in the drawings.

Let us now assume that the platform or carriage is at the bottom of the crib and a through passage is desired to the top of the crib or to any intermediate landing, and it is preferred to make the trip without opening any of the gates that are passed. To do this it is necessary simply to throw the dog C back into a disengaging position, as seen in Fig. 4, where it will remain out of engaging position and then it will pass all the carriages B' as the platform rises and none of the gates will be open. In like manner if it be desired to pass all the gates going down without opening any it is only necessary to throw the dog C' back out of engaging position and all the carriages B with which it would otherwise engage will be passed and the gates will remain closed. These dogs are of course understood to be within convenient reach of the elevator man and their change of position is the action of but a moment either to be thrown into engaging or disengaging position.

What I claim is—

1. In elevators, a pair of vertically arranged tracks having each an inwardly curved end, a carriage on each track and the elevator gate connected by cords with said carriages, substantially as set forth.

2. The elevator gate, two stationary tracks, a carriage on each track and cords connecting said carriages and the said gate, and projections on the platform or carriage to engage said carriages, substantially as set forth.

3. The parallel vertical tracks having each an inwardly turned end, a carriage on each track, the gate and cords connecting the gate and carriages, in combination with the platform and pivoted projections thereon to engage said carriages, substantially as set forth.

4. The platform and pivoted projections at different elevations thereon, in combination with the elevator gate and a pair of carriages connected by cords with said gate and tracks for said carriages fixed to the crib frame, substantially as set forth.

5. The double tracks having each an inwardly curved end, a carriage on each track, cords connecting said carriages and a gate connected by cords with said carriages, in combination with the platform and pivoted dogs thereon at different elevations to engage said carriages, said dogs constructed to be thrown out of engaging position, substantially as set forth.

JOHN THOMAS HOBBS.

Witnesses:
    REUBEN BROOKER,
    THOMAS EVANS.